United States Patent
Kupratis

(10) Patent No.: US 10,066,547 B2
(45) Date of Patent: Sep. 4, 2018

(54) COMBINED TWO ENGINE CYCLE WITH AT LEAST ONE RECUPERATED CYCLE ENGINE FOR ROTOR DRIVE

(71) Applicant: United Technologies Corporation, Hartford, CT (US)

(72) Inventor: Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 482 days.

(21) Appl. No.: 14/737,633

(22) Filed: Jun. 12, 2015

(65) Prior Publication Data

US 2016/0003144 A1 Jan. 7, 2016

Related U.S. Application Data

(60) Provisional application No. 62/019,478, filed on Jul. 1, 2014.

(51) Int. Cl.
    *F02C 6/02* (2006.01)
    *B64C 27/14* (2006.01)
    (Continued)

(52) U.S. Cl.
    CPC ............... *F02C 6/02* (2013.01); *B64C 27/14* (2013.01); *B64D 35/08* (2013.01); *F01D 13/003* (2013.01);
    (Continued)

(58) Field of Classification Search
    CPC . B64C 27/14; B64D 35/08; F02C 6/02; F02C 3/145; F02C 6/18; F02C 7/10; F02C 7/32; F02C 7/36; F01D 13/003; F01D 15/12; F02K 1/06; F05D 2220/32; F05D 2220/329; F05D 2220/74; F05D 2240/24; F05D 2260/20; F05D 2260/40311
See application file for complete search history.

(56) References Cited

U.S. PATENT DOCUMENTS

| 5,873,546 A | 2/1999 | Evans et al. |
| 6,105,364 A * | 8/2000 | Zdybel .................. F02K 3/025 |
| | | 239/265.19 |

(Continued)

FOREIGN PATENT DOCUMENTS

| EP | 0272822 A1 | 6/1988 |
| EP | 2052967 A1 | 4/2009 |

(Continued)

OTHER PUBLICATIONS

European Search Report for European Application No. 15174825.8 completed Nov. 26, 2015.

*Primary Examiner* — Mary A Davis
(74) *Attorney, Agent, or Firm* — Carlson, Gaskey & Olds, P.C.

(57) ABSTRACT

A drive architecture comprises a rotor and a gearbox for driving the rotor. A pair of input gears provides rotational drive to the gearbox. A first recuperative cycle engine drives one of the pair of gears and a second engine drives the other of the pair of gears. The first recuperative cycle engine and the second engine are both gas turbine engines. A power takeoff from a drive shaft of the second engine supplies rotational drive to drive at least one component in the first recuperative cycle drive.

20 Claims, 6 Drawing Sheets

(51) Int. Cl.
  *F02C 7/10* (2006.01)
  *F02C 6/18* (2006.01)
  *F02C 3/14* (2006.01)
  *F02C 7/36* (2006.01)
  *B64D 35/08* (2006.01)
  *F01D 15/12* (2006.01)
  *F01D 13/00* (2006.01)
  *F02C 7/32* (2006.01)

(52) U.S. Cl.
  CPC .............. *F01D 15/12* (2013.01); *F02C 3/145* (2013.01); *F02C 6/18* (2013.01); *F02C 7/10* (2013.01); *F02C 7/32* (2013.01); *F02C 7/36* (2013.01); *F05D 2220/329* (2013.01); *F05D 2260/40311* (2013.01); *F05D 2260/532* (2013.01)

(56) References Cited

U.S. PATENT DOCUMENTS

| | | | |
|---|---|---|---|
| 6,193,189 B1 | 2/2001 | Keever | |
| 6,698,181 B2 | 3/2004 | Certain | |
| 2005/0060983 A1* | 3/2005 | Lardellier | F02K 1/48 60/226.1 |
| 2013/0098052 A1* | 4/2013 | Bedrine | F02C 7/36 60/772 |
| 2015/0122944 A1* | 5/2015 | Dauriac | B64D 35/08 244/58 |

FOREIGN PATENT DOCUMENTS

| | | |
|---|---|---|
| EP | 2602458 A2 | 6/2013 |
| FR | 2992024 A1 | 12/2013 |
| GB | 1026458 | 4/1966 |

\* cited by examiner

COMBINED TWO ENGINE CYCLE WITH AT LEAST ONE RECUPERATED CYCLE ENGINE FOR ROTOR DRIVE

CROSS-REFERENCE TO RELATED APPLICATION

This application claims priority to U.S. Provisional Patent Application No. 62/019,478, filed Jul. 1, 2014.

BACKGROUND OF THE INVENTION

This application relates to a combination of two distinct engine types which can be efficiently utilized to drive a rotor.

Gas turbine engines are known and are used to drive a variety of aircraft. One known type of gas turbine engine is a so-called recuperated cycle engine. In such an engine, heat is captured and used to heat air downstream of a compressor prior to being delivered into a combustion section.

Another type of gas turbine engine is a simple cycle engine wherein such preheating does not occur.

Each type engine has its strengths.

Gas turbine engines have been utilized to drive rotary wing aircraft, such as a propeller system for a helicopter. Typically, a pair of engines are placed on the helicopter. Under certain conditions, drive from both of the engines is required. However, under many standard operating conditions, only one of the engines is sufficient to provide adequate power.

Pilots for such a rotary wing aircraft will often drive both engines as a safety measure.

SUMMARY OF THE INVENTION

In a featured embodiment, a drive architecture comprises a rotor and a gearbox for driving the rotor. A pair of input gears provides rotational drive to the gearbox. A first recuperative cycle engine drives one of the pair of gears and a second engine drives the other of the pair of gears. The first recuperative cycle engine and the second engine are both gas turbine engines. A power takeoff from a drive shaft of the second engine supplies rotational drive to drive at least one component in the first recuperative cycle drive.

In another embodiment according to the previous embodiment, the power takeoff from the second engine serves to provide rotational input to drive a compressor in the first recuperative cycle engine.

In another embodiment according to any of the previous embodiments, air downstream of the compressor in the first recuperative cycle engine is directed through a heat exchanger downstream of a turbine section in the first recuperative cycle engine. The air is heated and is then returned into a combustor section, which is intermediate the compressor and the turbine section in the first recuperative cycle engine.

In another embodiment according to any of the previous embodiments, air is tapped from the second engine downstream of a compressor in the second engine and passed into a second heat exchanger where it additionally provides heat to the air from the compressor in the first recuperative cycle engine before the air in the first recuperative cycle engine is returned to the combustion section.

In another embodiment according to any of the previous embodiments, the air from the second engine is passed from a location downstream of a single compressor rotor and through the second heat exchanger.

In another embodiment according to any of the previous embodiments, there are at least two compressor rotors in the compressor of the second engine. Air is passed into the second heat exchanger from the second engine at a location intermediate a first and second compressor rotor in the second engine.

In another embodiment according to any of the previous embodiments, a bypass feature is provided on the tap from the second engine into the second heat exchanger with the bypass being provided with valving to selectively deliver air from the second engine to the second heat exchanger or bypass air back to the second engine.

In another embodiment according to any of the previous embodiments, the drive shaft for the recuperative cycle engine also rotates a thrust propeller.

In another embodiment according to any of the previous embodiments, the second engine is a reverse core engine wherein air is delivered along a path past a turbine section in the second engine, past a compressor in the second engine, and then turned into the compressor for the second engine.

In another embodiment according to any of the previous embodiments, air downstream of the turbine section in the first recuperative cycle engine passes through a thrust nozzle.

In another embodiment according to any of the previous embodiments, the thrust nozzle is a variable area nozzle.

In another embodiment according to any of the previous embodiments, the power takeoff drives a generator to generate electricity.

In another embodiment according to any of the previous embodiments, the generator provides power to a power electronic system which, in turn, drives the mechanical connection.

In another embodiment according to any of the previous embodiments, a mechanical connection and a generator communicate with the power connection and with a shaft for the compressor in the second engine.

In another embodiment according to any of the previous embodiments, the mechanical connection provides power to the shaft for the compressor and the second engine.

In another embodiment according to any of the previous embodiments, the mechanical connection receives the rotary drive from the shaft of the compressor of the second engine.

In another embodiment according to any of the previous embodiments, the power takeoff drives a generator to generate electricity.

In another embodiment according to any of the previous embodiments, the generator provides power to a power electronic system which, in turn, drives the mechanical connection.

In another embodiment according to any of the previous embodiments, a mechanical connection and a generator communicate with the power connection and with a shaft for the compressor in the second engine.

In another embodiment according to any of the previous embodiments, the mechanical connection provides power to the shaft for the compressor and the second engine.

In another embodiment according to any of the previous embodiments, the mechanical connection receives the rotary drive from the shaft of the compressor of the second engine.

These and other features may be best understood from the following drawings and specification.

DETAILED DESCRIPTION

Figure 1:
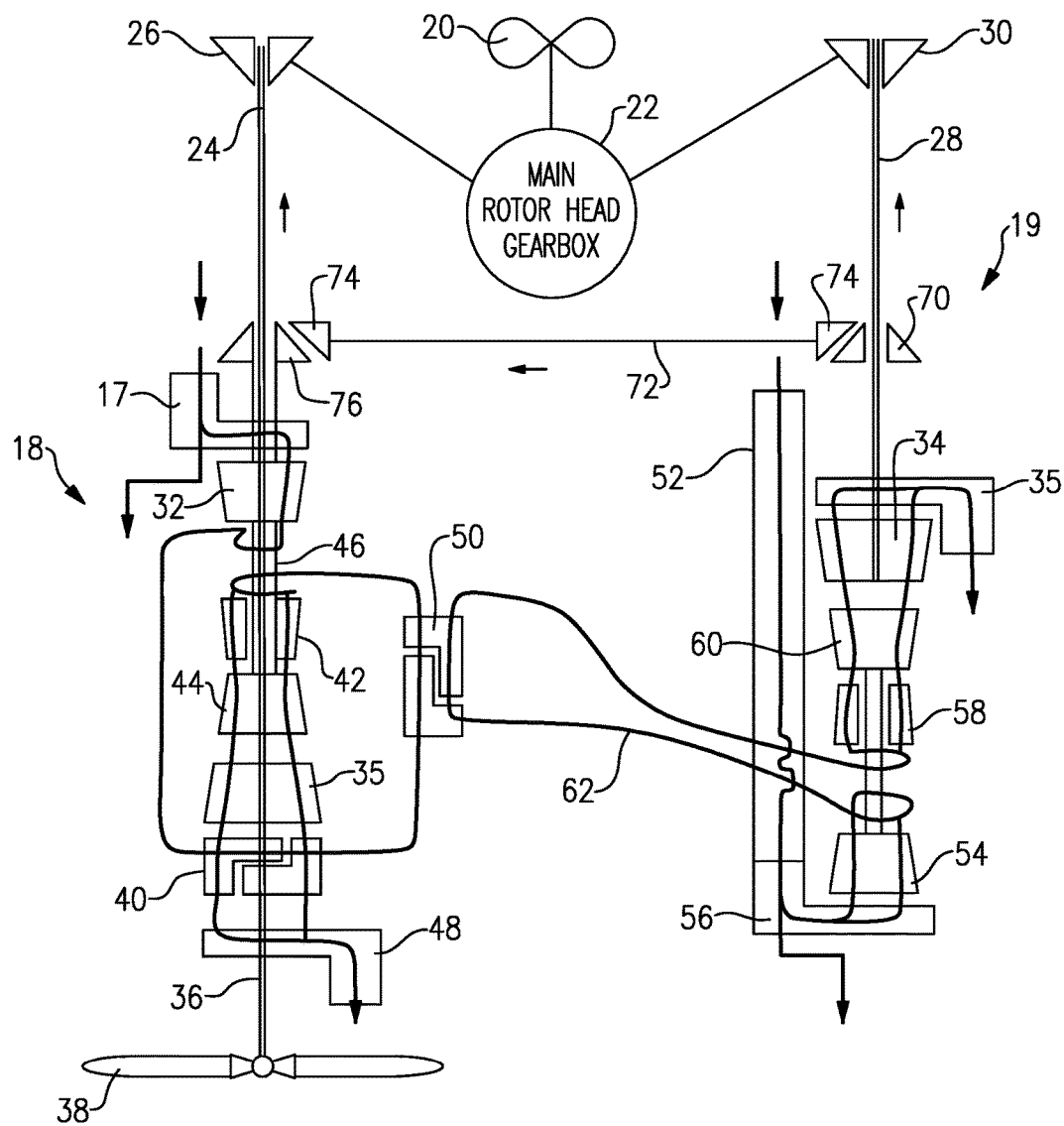
FIG. 1 shows a first schematic drive system for a rotary wing aircraft.

A rotary wing aircraft drive 20, such as a propeller system for a helicopter, is illustrated in FIG. 1. A main rotor gearbox 22 drives the propeller system 20. A pair of input drive gears 26 and 30 are shown schematically driving the gearbox 22. Gear 26 is driven by a shaft 24 on an engine 18. Gear 30 is driven by a shaft 28 which is part of an engine 19.

Engine 19 is a "reverse core" engine. Thus, an inlet duct 52 delivers air to a turning end 56, where it is then delivered into a compressor 54. The air is compressed in compressor 54, delivered into a combustion section 58, mixed with fuel and ignited. Products of this combustion pass downstream over a turbine rotor 60, which drives the compressor rotor 54. Downstream of the turbine rotor 60, the products of combustion drive another turbine rotor 34 which drives the shaft 28. Downstream of the turbine rotor 34, the products of combustion are reversed through an exit duct 35.

The engine 18 has an inlet duct 17 delivering air into a compressor 32. Compressor 32 delivers air into a combustion section 42, where it is mixed with fuel and ignited. Products of this combustion drive a turbine rotor 44, which, in turn, drives a shaft 46 to drive the compressor rotor 32. Downstream of the turbine rotor 44, the products of combustion drive another turbine rotor 35 to, in turn, drive the shaft 24 and a downstream shaft portion 36, which drives a thrust propeller 38.

Engine 18 is a recuperative engine, while engine 19 is a simple cycle engine. A simple cycle engine has one instance of heat input without work being added or subtracted. The heat input typically is a combustor. A recuperative, or regenerative cycle recycles a fraction of the heat input by the combustor by transferring heat from the gas flow of products of combustion exiting the turbine to the air flow that exits the compressor and enters the combustor. The heat transfer device typically is a heat exchanger.

In a regenerative cycle, the temperature of the air flow exiting the compressor is lower than the temperature of the gas flow exiting the turbine; hence, heat can be transferred from the gas flow to the air flow. This reduces the heat input required of the combustor.

In a simple cycle, the temperature of the air flow exiting the compressor is higher than the temperature of the gas flow exiting the turbine; hence, heat cannot be transferred from the gas flow to the air flow of the simple cycle engine. However, heat can be transferred from the air flow of the simple cycle engine to the air flow of the regenerative cycle engine. Transferring heat from the air flow of the simple cycle engine intercools the air flow of the compressor of the simple cycle engine, lowering the compressor exit temperature of the airflow of the simple cycle. Controlling compressor exit temperature is advantageous when the ambient air inlet temperature of the compressor is high. The combination synergistically controls the inlet temperature of the combustor for each engine.

As can be appreciated from the schematic of FIG. 1, air downstream of the compressor rotor 32 passes through a heat exchanger 40, where it is heated by the products of combustion downstream of the turbine rotor 35. The air may also pass to a heat exchanger 50 where it is heated by air from tap 62, which has been heated in the compressor 54.

Thus, when the air returns from the heat exchanger 50 to the inlet to the combustor 42, it has been preheated and, thus, the combustion is performed more efficiently.

In addition, a gear 76 rotates with the compressor 32 and receives drive from a bevel gear 74. Bevel gear 74 is driven by a gear 70, driven by the shaft 28.

When the associated aircraft driven by the propeller system 20 is being driven in a condition where it does not need both engines, the engine 19 supplements power to engine 18 through the gear 74. The gear and shaft combination 72/74 drive the gear 76 and supply power to the compressor 32. This saves power that the turbine 44 would otherwise have to deliver to the compressor 32 and results in higher temperatures preheating the air in the heat exchanger 40. As such, this cycle operates more efficiently.

Figure 2A:
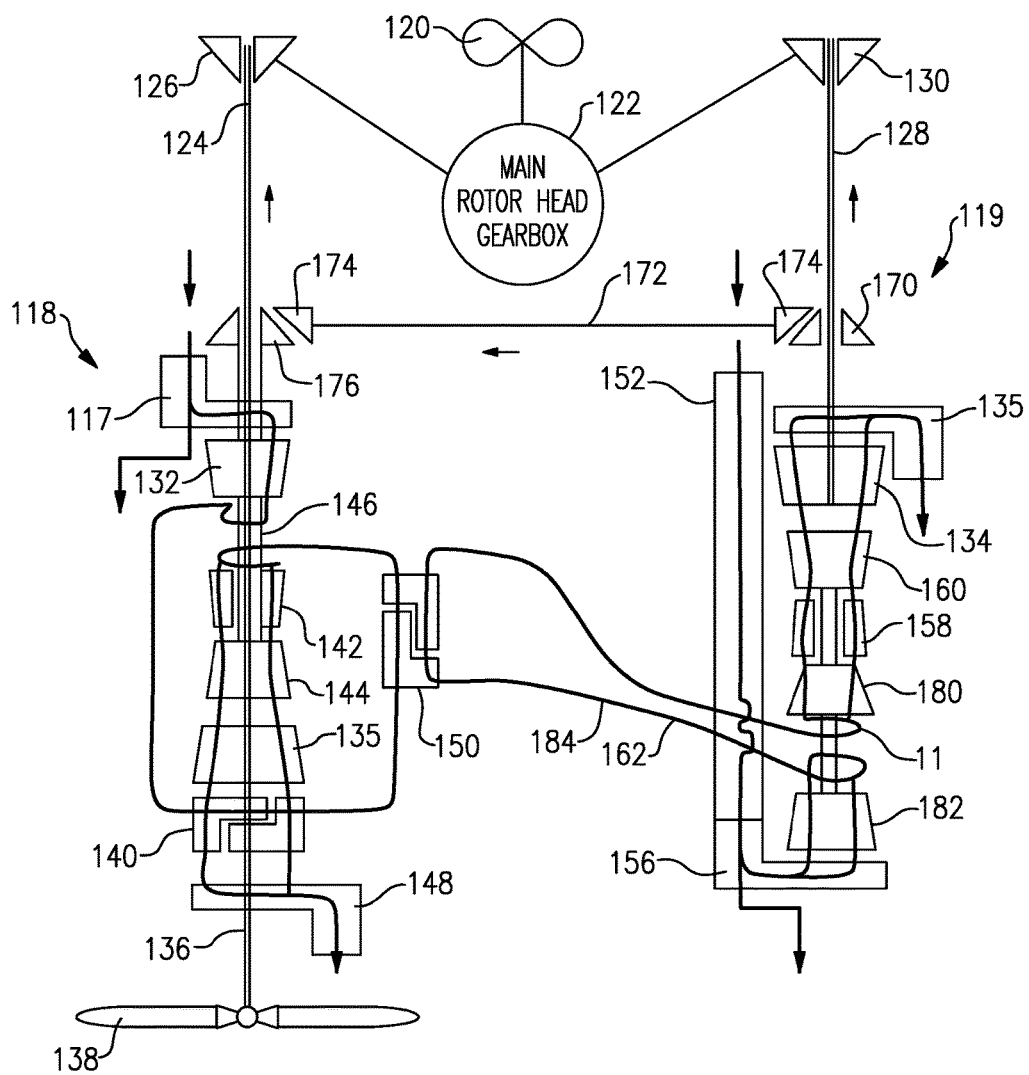
FIG. 2A shows a second embodiment.

FIGS. 2A and B show an engine system, wherein features generally identical to those of FIG. 1 are simply identified by a number moved 100 higher.

A difference is that the engine 119 now has two compressor rotors 180 and 182 and an intercooler 184 is passed through the heat exchanger 150, rather than the air downstream of the entire compressor section being delivered into the combustion section. Otherwise, this combination operates in a manner similar to that of FIG. 1.

Figure 2B:
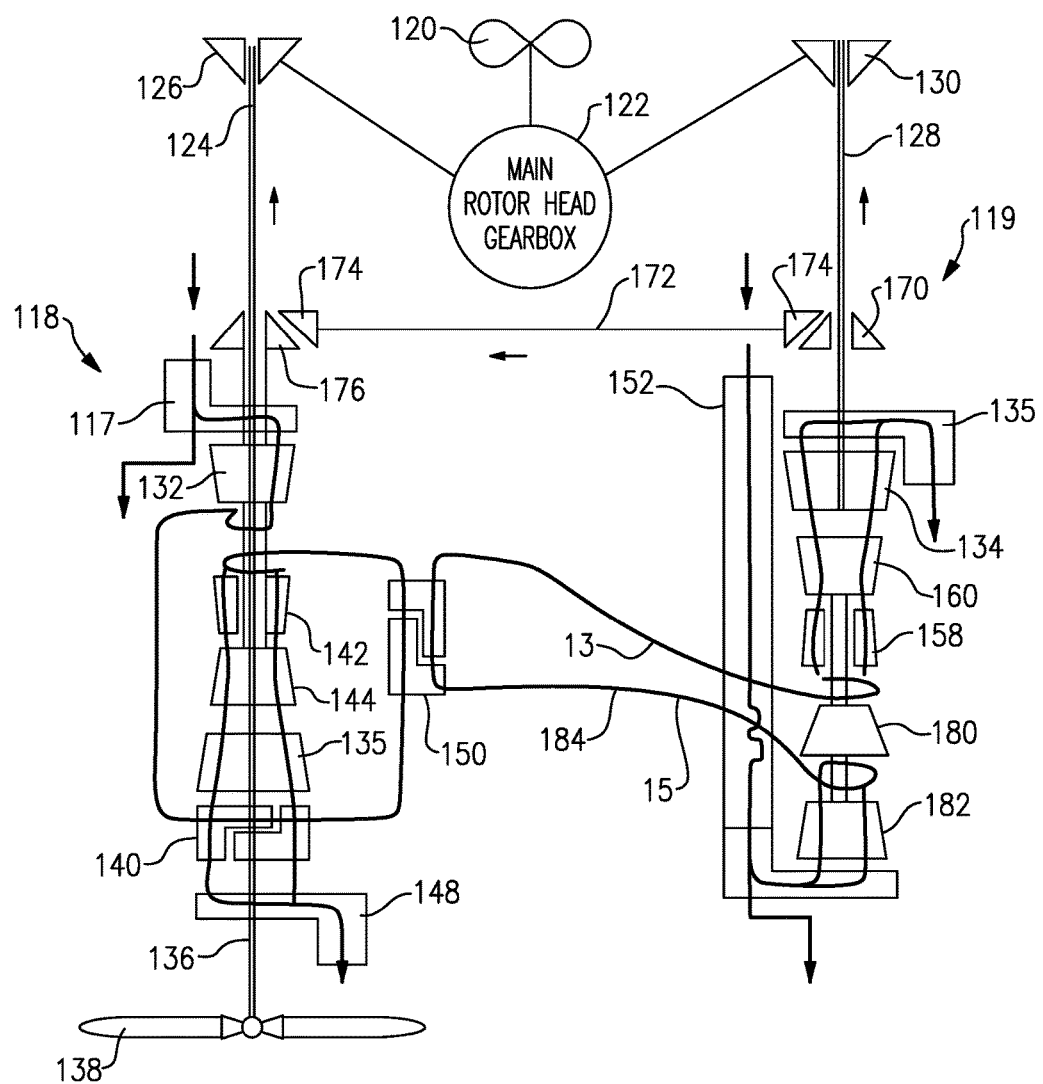
FIG. 2B shows an alternative.

In contrast, in FIG. 2B, a portion 15 of the refrigerant downstream of the compressor stage 182 is tapped as the intercooler 184, and is returned at 13 downstream of the compressor stage 180. A portion of the air compressed at stage 182 does pass the stage 180, and is then mixed with the returning fluid 13.

Figure 3:
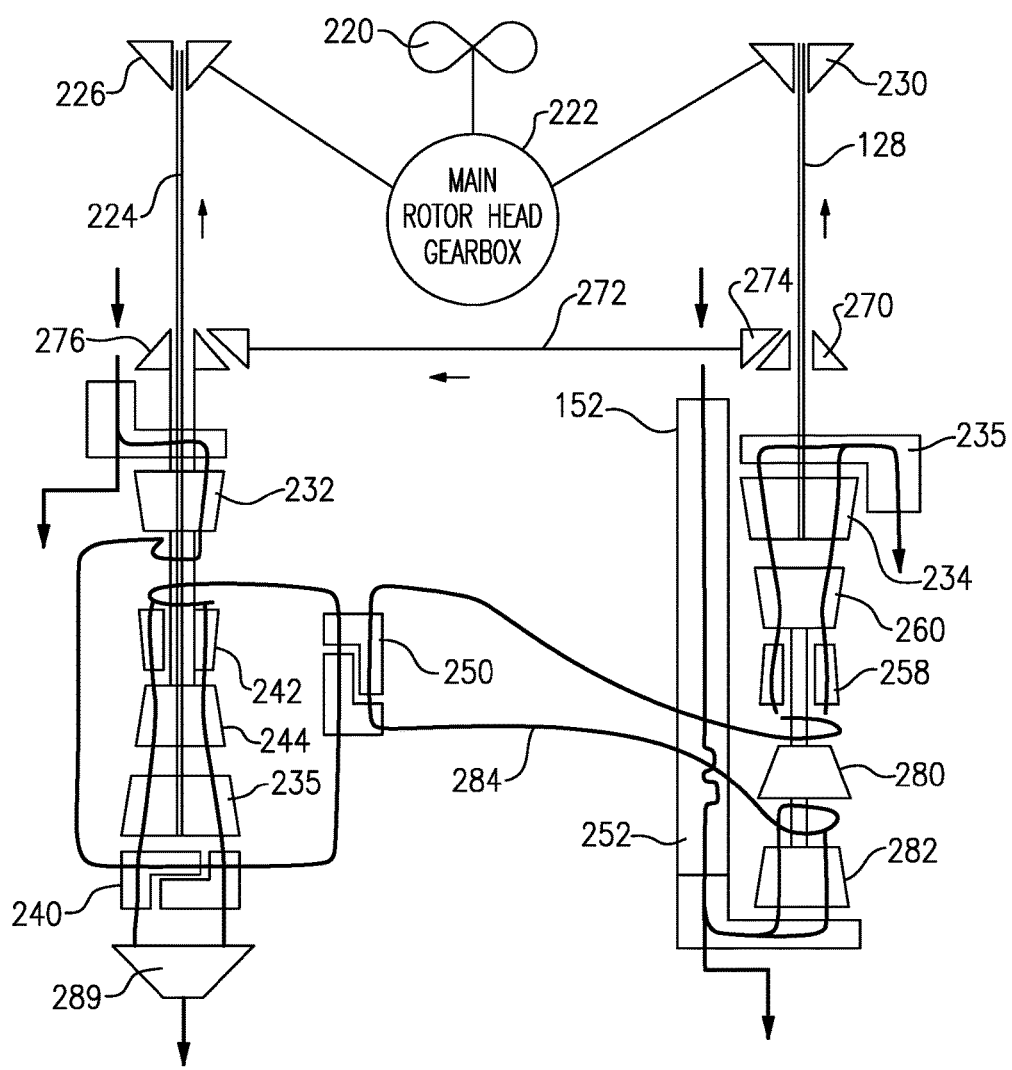
FIG. 3 shows a third embodiment.

FIG. 3 shows an engine wherein features identical to FIGS. 2A/B are identified by the number 200 added to the reference arrows in FIGS. 2A/B.

Here, the thrust propeller has been replaced by a thrusting nozzle 289, which may be a variable nozzle, as is otherwise known.

Figure 4:
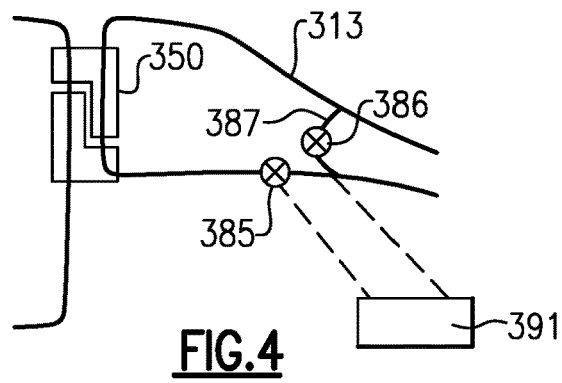
FIG. 4 shows a feature that may be incorporated into the above-referenced embodiments.

FIG. 4 shows the heat exchanger 350 and a feature which may be placed on the line 313 leading from the compressor section through the heat exchanger 350. As shown, a shutoff valve 385 may be controlled in combination with the valve 386 to divert air through a line 387, when it is not desired to achieve the intercooling.

An appropriate control 391 controls the valves 385 and 386 and a worker of ordinary skill in the art would understand when to provide such control.

Figure 5:
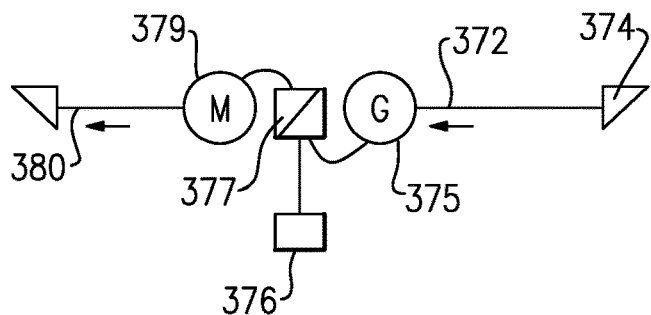
FIG. 5 shows another feature that may be incorporated into the embodiments.

FIG. 5 shows an embodiment wherein the connection between the engine is utilized to generate electrical power. As is shown, the gear 374 drives a shaft 372 which, in turn, drives a generator 375. Generator 375 powers a power electronics 377 which can provide electrical power to a use 376. The power electronics 377 drives a combined motor and mechanical connection 379 that passes rotational power to a shaft 380, such that it can supply drive to the recuperative engine, as in the prior embodiments.

Figure 6:
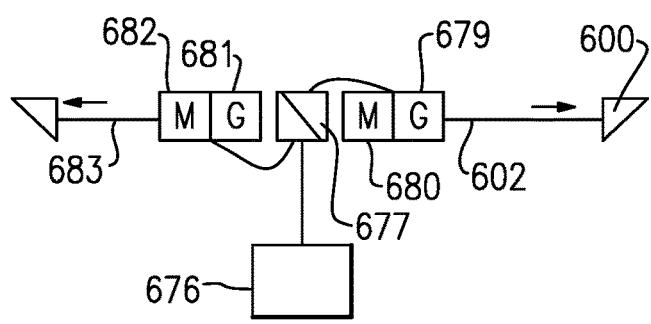
FIG. 6 shows an alternative embodiment.

FIG. 6 shows an embodiment, wherein the input gears 600 drives a shaft 602 to, in turn, drive a generator 679. Generator 679 supplies power to the power electronics 677. Motor and mechanical connection 680 receives power from the power electronics 677 to drive shaft 602. The combination of 680/679 also is known in the art as a motor/generator.

Downstream of the power electronics, another generator 681 generates electricity and supplies it back to the power electronics 677 and also drives a combined motor and mechanical connection 682, which drives the shaft portion 683 to supply mechanical energy to the recuperative engine 618. Another generator 681 generates electricity and supplies it back to the power electronics 677 and also drives the motor 682, which drives the shaft portion 683 to supply mechanical energy to the recuperative engine 618. Here again, a use 676 for generated electrical power is disclosed schematically. Mechanical power from engine 618 is converted to electrical power that is converted back to mechanical power to drive gear 600 that drives gear 670 and shaft 628 of engine 619. The combination of 682/681 also is known in the art as a motor/generator.

Figure 7A:
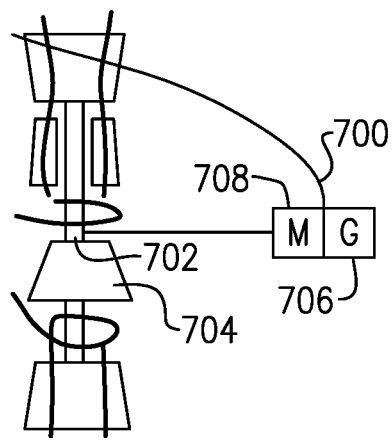
FIG. 7A shows yet another alternative.

FIG. 7A shows an embodiment which may be incorporated into the embodiments of FIG. 5 or 6. A generator 706 receives power from the line 700 which may be the power electronics in the FIG. 5 or 6 embodiment. It drives the mechanical connection 708 to supply power to a shaft 702, which drives a compressor 704.

Figure 7B:
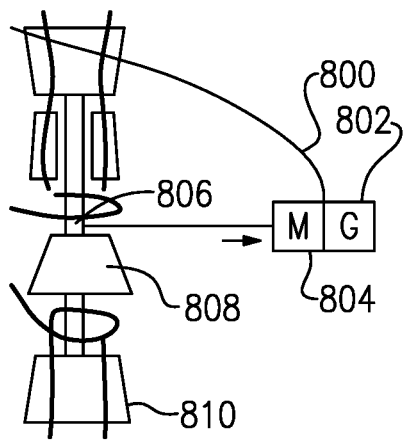
FIG. 7B shows yet another alternative.

FIG. 7B shows another embodiment wherein the compressors 808 and 810 rotate with a shaft 806 to, in turn, drive a mechanical connection 804 to generate electricity at generator 802 and supply that generator electricity though a line 800 back to the power electronics as in the FIG. 5 or 6 embodiments.

While a propeller system for a rotary wing aircraft is specifically disclosed, other gearbox applications for driving a rotor may benefit from these teachings. As an example, certain aircraft are provided with a lift fan, and a rotor for such a fan may well benefit from the drive architecture of this disclosure.

Although a number of embodiment of this invention has been disclosed, a worker of ordinary skill in this art would recognize that certain modifications would come within the scope of this invention. For that reason, the following claims should be studied to determine the true scope and content of this invention.

The invention claimed is:

1. A drive architecture comprising:
   a rotor and a gearbox for driving said rotor;
   a pair of input gears for providing rotational drive to said gearbox and a first recuperative cycle engine driving one of said pair of gears and a second engine driving the other of said pair of gears;
   said first recuperative cycle engine and said second engine both being gas turbine engines, with a power takeoff from a drive shaft of said second engine supplying rotational drive to drive at least one component in said first recuperative cycle drive; and
   wherein air downstream of a compressor in said first recuperative cycle engine is directed through a heat exchanger downstream of a turbine section in said first recuperative cycle engine, the air is heated by products of combustion downstream of said turbine section in said first recuperative cycle engine and is then returned into a combustor section in said first recuperated cycle engine, which is intermediate said compressor and said turbine section in said first recuperative cycle engine.

2. The drive architecture as set for in claim 1, wherein said power takeoff from said second engine serves to provide rotational input to drive a compressor in said first recuperative cycle engine.

3. The drive architecture as set for in claim 1, wherein air is tapped from said second engine downstream of a compressor in said second engine and passed into a second heat exchanger where it additionally provides heat to the air from said compressor in said first recuperative cycle engine before the air in said first recuperative cycle engine is returned to said combustion section.

4. The drive architecture as set for in claim 3, wherein said air from said second engine is passed from a location downstream of a single compressor rotor and through said second heat exchanger.

5. The drive architecture as set for in claim 3, wherein there are at least two compressor rotors in the compressor of said second engine and the air is passed into said second heat exchanger from said second engine at a location intermediate a first and second compressor rotor in the second engine.

6. The drive architecture as set for in claim 3, wherein a bypass feature is provided on said tap from said second engine into said second heat exchanger with said bypass being provided with valving to selectively deliver air from said second engine to said second heat exchanger or bypass air back to said second engine.

7. The drive architecture as set for in claim 1, wherein said drive shaft for said recuperative cycle engine also rotates a thrust propeller.

8. The drive architecture as set for in claim 1, wherein said second engine is a reverse core engine wherein air is delivered along a path past a turbine section in said second engine, past a compressor in said second engine, and then into the compressor for said second engine.

9. The drive architecture as set for in claim 1, wherein air downstream of the turbine section in the first recuperative cycle engine passing through a thrust nozzle.

10. The drive architecture as set for in claim 9, wherein said thrust nozzle is a variable area nozzle.

11. The drive architecture as set for in claim 1, wherein said power takeoff driving a generator to generate electricity.

12. The drive architecture as set for in claim 11, wherein said generator providing power to a power electronic system which, in turn, drives a mechanical connection.

13. The drive architecture as set for in claim 1, wherein a mechanical connection and a generator communicate with said power connection and with a shaft for said compressor in said second engine.

14. The drive architecture as set for in claim 13, wherein said mechanical connection providing power to said shaft for said compressor of said second engine.

15. The drive architecture as set for in claim 13, wherein said mechanical connection receiving a rotary drive from said shaft of said compressor of said second engine.

16. The drive architecture as set for in claim 1, wherein said power takeoff driving a generator to generate electricity.

17. The drive architecture as set for in claim 16, wherein said generator providing power to a power electronic system which, in turn, drives a mechanical connection.

18. The drive architecture as set for in claim 16, wherein a mechanical connection and a generator communicate with said power connection and with a shaft for a compressor in said second engine.

19. The drive architecture as set for in claim 18, wherein said mechanical connection providing power to said shaft for said compressor of said second engine.

20. The drive architecture as set for in claim 18, wherein said mechanical connection receiving said rotary drive from said shaft of said compressor of said second engine.

* * * * *